United States Patent [19]

Sakamoto et al.

[11] 4,164,359

[45] Aug. 14, 1979

[54] HYDRAULIC TRANSPORTATION APPARATUS FOR SOLID MATERIALS

[75] Inventors: Masakatsu Sakamoto, Matsudo; Kenji Uchida, Kashiwa; Takafumi Karino, Nishiibaraki, all of Japan

[73] Assignee: Hitachi, Ltd., Japan

[21] Appl. No.: 868,663

[22] Filed: Jan. 11, 1978

[30] Foreign Application Priority Data

Jan. 17, 1977 [JP] Japan ................................. 52/2870

[51] Int. Cl.² .......................................... B65G 53/30
[52] U.S. Cl. .............................................. 406/121
[58] Field of Search ...................... 302/14, 15, 66, 11; 417/900

[56] References Cited

U.S. PATENT DOCUMENTS

| | | | |
|---|---|---|---|
| 2,793,082 | 5/1957 | Gardner | 302/14 |
| 3,306,671 | 2/1967 | Leeman | 302/14 |
| 3,368,876 | 2/1968 | Bailey | 302/14 X |
| 3,449,013 | 6/1969 | Sakamoto et al. | 302/14 |
| 3,637,263 | 1/1972 | Wasp | 302/14 X |
| 3,938,912 | 2/1976 | Sakamoto et al. | 302/14 X |

*Primary Examiner*—Robert B. Reeves
*Assistant Examiner*—James L. Rowland
*Attorney, Agent, or Firm*—Craig and Antonelli

[57] ABSTRACT

In a transportation of solid materials of a wide grain-size distribution, including fine and coarse particles, a liquid as a transportation medium is added to the materials to turn them into slurry, so as to transport the latter hydraulically. The waste solution after the transportation is thickened into a heavy media, by dehydrator and solid-liquid clarifier, and reserved in a heavy media tank adapted to suitably adjust the concentration of the media. The media in the heavy media tank is returned to the transportation source, so as to serve as the transportation medium for transporting the slurry.

3 Claims, 2 Drawing Figures

HYDRAULIC TRANSPORTATION APPARATUS FOR SOLID MATERIALS

The present invention relates to a hydraulic transportation of granular solid materials of a wide range of grain-size distribution, i.e., granular materials of various grain sizes including even fine and, to the contrary, coarse materials, and, more particularly, to a hydraulic transportation apparatus for the described purpose, adapted to recirculate the waste solution after the transportation for a repeated use.

Various types of hydraulic transportation apparatus have been proposed up to now. Hydrohoists as disclosed in the specifications of U.S. Pat. Nos. 3,449,013 and 3,938,912 are typical examples of these hydraulic transportation apparatus. In these apparatus, a liquid, which serves as a transportation medium, is added to the solid materials to be transported, so that the materials are conveyed in the form of slurry. The waste solution after the transportation is treated by a suitable water disposal system. Alternatively, especially in the case of mining industry, the fine slurry after the transportation is fed back to the source, so as to fill the trace of the excavation.

The former way of solution requires an impractically large scale of water disposal system which, in addition, involves an extremely troublesome maintenance work.

The latter way, i.e., feeding of the waste slurry back to the source is allowed only for specific mines and cannot be applied to other ordinary uses.

Thus, in most cases where the hydraulic transportation apparatus are used, all of the waste solution has to be treated suitably by a water disposal system, which requires a colossal sum of installation cost, and, even by such a treatment, the possibility of an accidental pollution cannot completely be swept away.

It is therefore an object of the invention to overcome the above stated problems of the prior art by providing a hydraulic transportation apparatus for solid materials, in which the waste solution after the transportation is recirculated for repeated use, so as to eradicate the problem of pollution which might, otherwise, be caused by the waste solution.

To this end, according to the invention, there is provided a hydraulic transportation apparatus which comprises a transporting hydrohoist adapted to transport solid materials of a wide range of grain-size distribution in the form of a slurry; dehydrating means for separating relatively coarse particles from said slurry having been transported by said hydrohoist; solid-liquid clarification means extracting fine particles from the solution of fine particles, said solution having been separated by said dehydrating means; a heavy media tank adapted to maintain the concentration of the heavy media obtained from said dehydrating means and said solid-liquid clarification means; and a returning hydrohoist adapted to return said heavy media contained by said heavy media tank; wherein a heavy media returning pipe leading from said returning hydrohoist is connected to a high-pressure liquid recirculation pipe of said transporting hydrohoist, so that said solid material in the form of slurry may be transported by said heavy media.

The above and other objects, as well as advantageous features of the invention will become clear from the following description of the preferred embodiments taken in conjunction with the accompanying drawings in which:

FIG. 1 is a schematic illustration of a known hydraulic hoist, while

Hereinafter, a preferred embodiment of the invention will be described in detail, with reference to the attached drawings.

Figure 1:
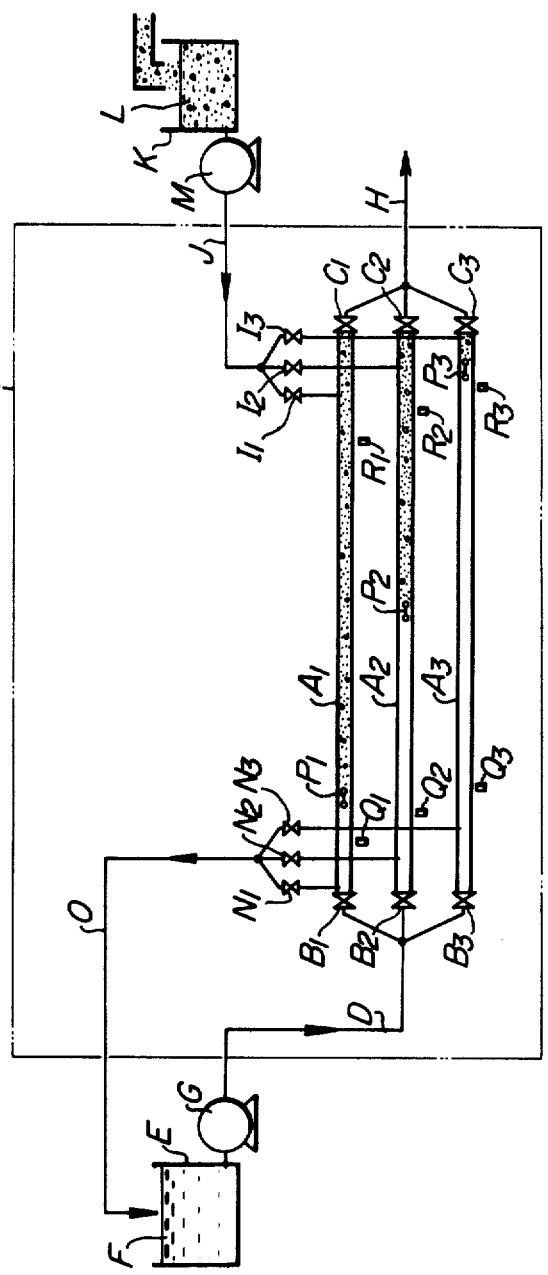

The hydraulic transportation apparatus of the invention incorporates a hydrohoist 1 for press-feeding solid materials, which may be a known one typically having a construction as shown in FIG. 1.

To explain in more detail, referring to FIG. 1, driving liquid feed valves B1, B2 and B3 and slurry feed valves C1, C2 and C3 are provided at opposite sides of a plurality of parallel feed pipes A1, A2 and A3. To the inflow sides of the valves B1, B2 and B3, connected through a piping D is a high-pressure pump G adapted to press-feed the driving liquid F in a tank E into the feed pipes, while a transport pipe H is connected to the outflow sides of the valves C1, C2 and C3.

A slurry pump M is connected to the inflow sides of the valves C1, C2 and C3, for feeding the slurry L within a tank K, through a piping J and then through slurry supplying valves I1, I2 and I3.

At the same time, a return piping O is connected to the outflow sides of the valves B1, B2 and B3, for returning the driving liquid in the feed pipes through driving liquid returning valves N1, N2 and N3.

Detectors Q1, Q2 and Q3 and R1, R2 and R3, which are provided at both end portions of respective feed pipes, are adapted to detect the arrival of separators, which have been inserted in the feed pipes around the boundaries between the slurry and the driving liquid, at the left and right limit positions.

For forwarding the slurry L from the transport pipe H, at first the driving liquid feed valves B1, B2 and B3, as well as the slurry feed valves C1, C2 and C3 are kept closed. Then, with the driving liquid returning valves N1, N2 and N3, as well as the slurry supplying valves I1, I2 and I3 having been opened, the slurry pump M is started to supply the slurry L within the tank K into the feed pipes A1, A2 and A3.

As a result of the supply of the slurry, the driving liquid F in the feed pipes is displaced and partially returned to the tank E through the return piping O. At the same time, the separators P1, P2, P3 in the feed pipes are moved leftward, and finally reach the left limit position. As the separators are detected to have reached respective left limit positions by the detectors Q1, Q2, Q3, the pump M is stopped, and the driving liquid returning valves N1, N2, N3, as well as the slurry supplying valves I1, I2 and I3, are closed.

Then, the driving liquid feed valves B1, B2, B3, as well as the slurry supplying valves I1, I2, I3 are opened, while the high-pressure pump G is put into operation, so that the driving liquid is fed into the feed pipes to drive the slurry toward the transport pipe H. As a result of the driving of the slurry by the driving liquid, the separators are moved rightward. Upon detecting the arrival of the separators at the right limit positions, the detectors R1, R2, R3, deliver signals to stop the high-pressure pump G. At the same time, the driving liquid feed valves B1, B2, B3 and the slurry feed valves C1, C2, C3 are closed, while the driving liquid returning valves N1, N2, N3 and the slurry supplying valves I1, I2, I3 are actuated to open. The explained process is repeated as the slurry pump M is started again. The opening and closing operations of valves of respective feed pipes are performed in accordance with a suitable preset time cycle, alternatingly and successively, so that the slurry may be continuously forwarded through continuous operations of the high-pressure pump G and the slurry pump M.

Figure 2:
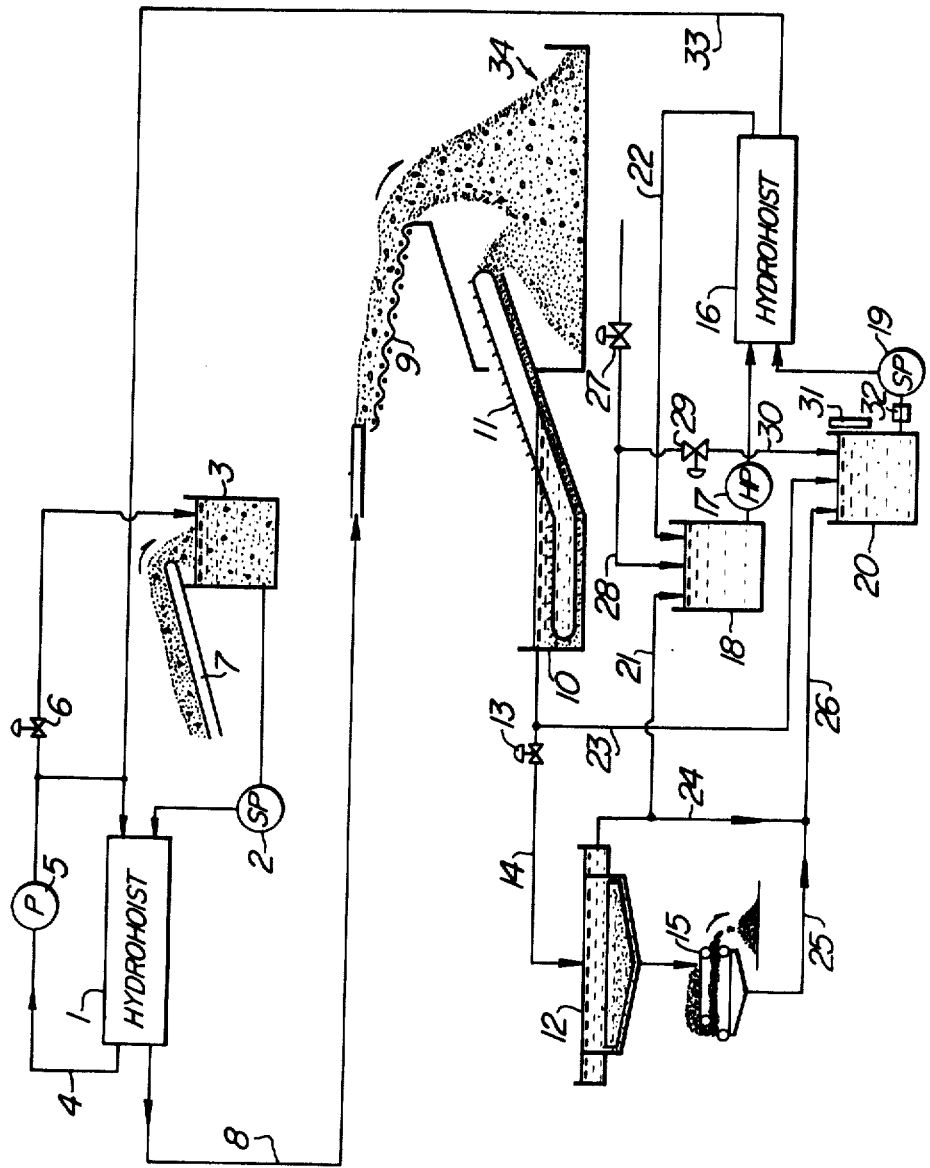
FIG. 2 is a flow sheet of an operation performed by a hydraulic transportation apparatus for solid materials, in accordance with the present invention.

In FIG. 2, as will be apparent from the above descriptions with reference to FIG. 1, the slurry in a mixing tank 3 is supplied or introduced into the feed pipes $A_1$, $A_2$ and $A_3$ of a hydrohoist 1 by a slurry pump 2. The slurry introduced into the feed pipes $A_1$, $A_2$ and $A_3$ of the hydrohoist 1 is forced through a pipe 4 by the heavy media supplied into the feed pipes $A_1$, $A_2$ and $A_3$ through a heavy media returning pipe 33 and the piping D from a returning hydrohoist 16. The heavy media after forcing the slurry is then discharged from the returning pipe O into a high-pressure liquid recirculation pipe 4, by the slurry supplied into the feed pipes from the mixing tank 3 by the slurry pump 2. That is, the heavy media supplied into the feed pipes $A_1$, $A_2$ and $A_3$ of the hydrohoist 1 is discharged into the high-pressure liquid recirculation pipe 4, by the same volume as that of the slurry supplied from the mixing tank 3 into the feed pipes of the hydrohoist 1 by the slurry pump 2. The heavy media discharged through the pipe 4 is pressurized by a heavy media pump 5, and a part of the heavy media is returned into the feed pipes of the hydrohoist 1 to force the slurry in the feed pipes. The remaining heavy media is returned through a flow rate control valve 6 into the mixing tank 3. As should be apparent from the above, the volume of the heavy media returned into the mixing tank 3 can be adjusted relative to that returned to line 33 by valve 6 and, thus, can make up for the transport liquid withdrawn as part of the slurry supplied from the mixing tank to the hydrohoist 1 by the slurry pump.

Meanwhile, solid material is delivered from a conveyor 7 to the mixing tank 3. A transport pipe 8 extends from the transporting hydrohoist 1 to the pool 34 of the slurry. In the slurry pool 34, there are installed a screen 9 adapted to separate coarse solid materials from solution suspending fine particles in the slurry which has been transported to the pool 34 through the transport pipe 8, a sedimentation or settling basin 10 for the solution separated by the screen, a dehydration apparatus consisting of a double chain conveyor 11 for scraping fine solid particles depositing at the bottom of the settling basin 10, a thickener 12 connected to the settling basin 10 and adapted to thicken the solution suspending fine particles which is introduced through an overflow pipe 14 having a flow-rate control valve 13, and a dehydrator 15 adapted for further dehydrating the solution which has been thickened by the thickener 12 and consisting of, for example, solid-liquid clarifier constituted by a filter press.

The returning hydrohoist 16 is a known one and can have the same construction as the transporting hydrohoist 1. The hydrohoist 16 is so arranged to receive both of fresh water, which is supplied from a fresh water tank 18 by a fresh water pump 17, and the heavy media supplied from a heavy media tank 20 by a charging pump 19. The settled water available at the upper portion of the thickener 12 is introduced into the fresh water tank 18, through an overflow pipe 21. Also, the water returned during the forwarding of the heavy media from the hydrohoist 16 is introduced into the fresh water tank 18, through a piping 22.

On the other hand, the heavy media tank 20 is adapted to receive an overflow water from the settling basin 10 through a piping 23, an overflow water from the thickener 12 through a piping 24, and a drain from the belt press 15 through a piping 25.

A fresh water make up pipe 28 having a flow-rate control valve 27 is adapted to introduce the fresh water into the fresh water tank 18. Another fresh water make up pipe 30, shunting from the pipe 28 and having a flow-rate control valve 29 is adapted to introduce fresh water into the heavy media tank 20. A heavy media detector 31 and a thickness meter 32 are provided on the heavy media tank 20.

The operation of the hydraulic transportation apparatus of the invention having the described construction will be described hereinafter.

Solid slurry including solid particles of a wide range of grain-size distribution is delivered from the conveyor 7 to the mixing tank 3, and is supplied to the transporting hydrohoist 1 by means of the slurry pump 2. The slurry supplied to the hydrohoist 1 is then fed and forwarded by the heavy media (in case of the starting operation, fresh water is used in place of the heavy media) which has been returned from the returning hydrohoist 16 through the heavy media returning pipe 33. The forwarded slurry is transported through the transport pipe 8 to the screen 9. The coarse solid particles separated by the screen 9 is sent to the pool 34, while the slurry containing fine solid particles drips and falls into the settling basin 10. Particles of a size larger than a predetermined size, which is typically 0.15 mm or so, deposited at the bottom of the settling basin 10 are scraped by the double chain conveyor 11, and delivered to the pool 34.

The water overflowing from the settling basin 10 contains fine particles of a size of, for example, smaller than 0.15 mm. A part of this overflow is sent to the thickener 12, through the overflow pipe 14. The water thickened by the thickener 12 is further dehydrated by the dehydrator 15. The dehydrated particles are compacted and taken out in the form of a cake.

Meanwhile, the settled water in the thickener 12, which has become substantially free of particles, is partly fed to the fresh water tank 18, through the piping 21, while the remainder thereof is sent to the heavy media tank 20 through the pipings 24, 26. Then, this water is returned, along with the heavy media, which has been fed to the heavy media tank 20 through the piping 23 and containing fine particles of, for example, smaller than 1.5 mm, to the high-pressure liquid recirculating pipe 4 of the transporting hydrohoist 1, through the piping 33, by means of the hydrohoist 16.

During the dehydrating process, the water or moisture is reduced carried by the particles or by evaporation, so that the flow rate of the liquid introduced into the heavy media tank 20 varies in accordance with the condition. Therefore, the amount of recollected liquid is detected by the level detector 31 attached to the heavy media tank 10. The detector delivers a signal to the flow-rate control valves 29 and 13 of the fresh water make up pipe 30 and the overflow pipe 14, so as to actuate them, thereby to control the amount of the heavy media.

Supposing that the overflow from the settling basin 10 is used repeatedly, the heavy media in the tank 20 will be gradually concentrated to impractically increase the viscosity of the media.

However, this can be avoided by detecting the concentration by the heavy media by the thickness meter 32 mounted on the tank 20 and then suitably operating the flow-rate control valve 13 or 29 in accordance with the detected concentration.

As have been described, the following advantages are derived from the invention.

(1) Since the waste solution or effluent, i.e., the heavy media, after the dehydration is recirculated for an effective repeated use, the scale of the slurry disposal system for treating the slurry containing the fine particles, which is extremely difficult to separate, can conveniently be minimized.

(2) The whole system is rendered entirely free from the problem of environmental pollution, because no effluent is discharged out of the system.

(3) Continuous operation of the system is maintained simply only by making up fresh water at the returning hydrohoist side. The make up fresh water can be extracted from the recollected heavy media.

(4) Since the solid material is suspended and transported by a heavy media, the limited flowing velocity can be made small enough to prevent the wear of the transport pipe, as well as to reduce the power consumption.

What is claimed is:

1. Apparatus for hydraulically transporting particulate solid material having a wide range of particle-size distribution, comprising:

a first tank receiving therein a first slurry, said first slurry being a mixture of said particulate solid material and a liquid as a transporting medium;

a first hydrohoist connected to said first tank and operated by a driving liquid for forcing said first slurry from said first tank;

a transporting line having one end thereof connected to said first hydrohoist, said first slurry forced by said first hydrohoist being transported through said transporting pipe;

coarse particle separating means located at the other end of said transporting line and receiving said first slurry transported through said transporting line for removing relatively coarse particles from said first slurry to produce a second slurry containing relatively fine particles;

solid-liquid separating means connected to said coarse particle separating means and receiving said second slurry from said coarse particle separating means for removing fine particles from said second slurry to produce a substantially particle-free liquid;

a second tank;

conduit means connecting said coarse particle separating means and said solid-liquid separating means to said second tank for introducing therein heavy media including said second slurry from said coarse particle separating means and said substantially particle-free liquid from said solid-liquid separating means;

means associated with said second tank for adjusting the concentration of said heavy media in said second tank;

a second hydrohoist positioned between said second tank and said first hydrohoist for returning said heavy media from said second tank to said first hydrohoist as said driving liquid therefor;

second conduit means having one end connected to said second hydrohoist and another end connected to said first hydrohoist;

means for returning a part of the driving liquid discharged from said first hydrohoist to the second conduit means for reuse as a driving liquid for the first hydrohoist and feeding the remaining driving liquid into said first tank as said transporting medium.

2. A hydraulic transportation apparatus as claimed in claim 1, wherein said coarse particle separating means include a screen adapted to separate the coarse particles from the solution suspending fine particles, a settling basin for said solution separated by said screen, and a conveyor for scraping solid particles depositing on the bottom of said settling basin.

3. A hydraulic transportation apparatus as claimed in claim 1, wherein said solid-liquid separation means include a thickener adapted to thicken the solution suspending fine particles, and a dehydrator adapted to further dehydrate the particles which have been thickened by said thickener.

* * * * *